UNITED STATES PATENT OFFICE.

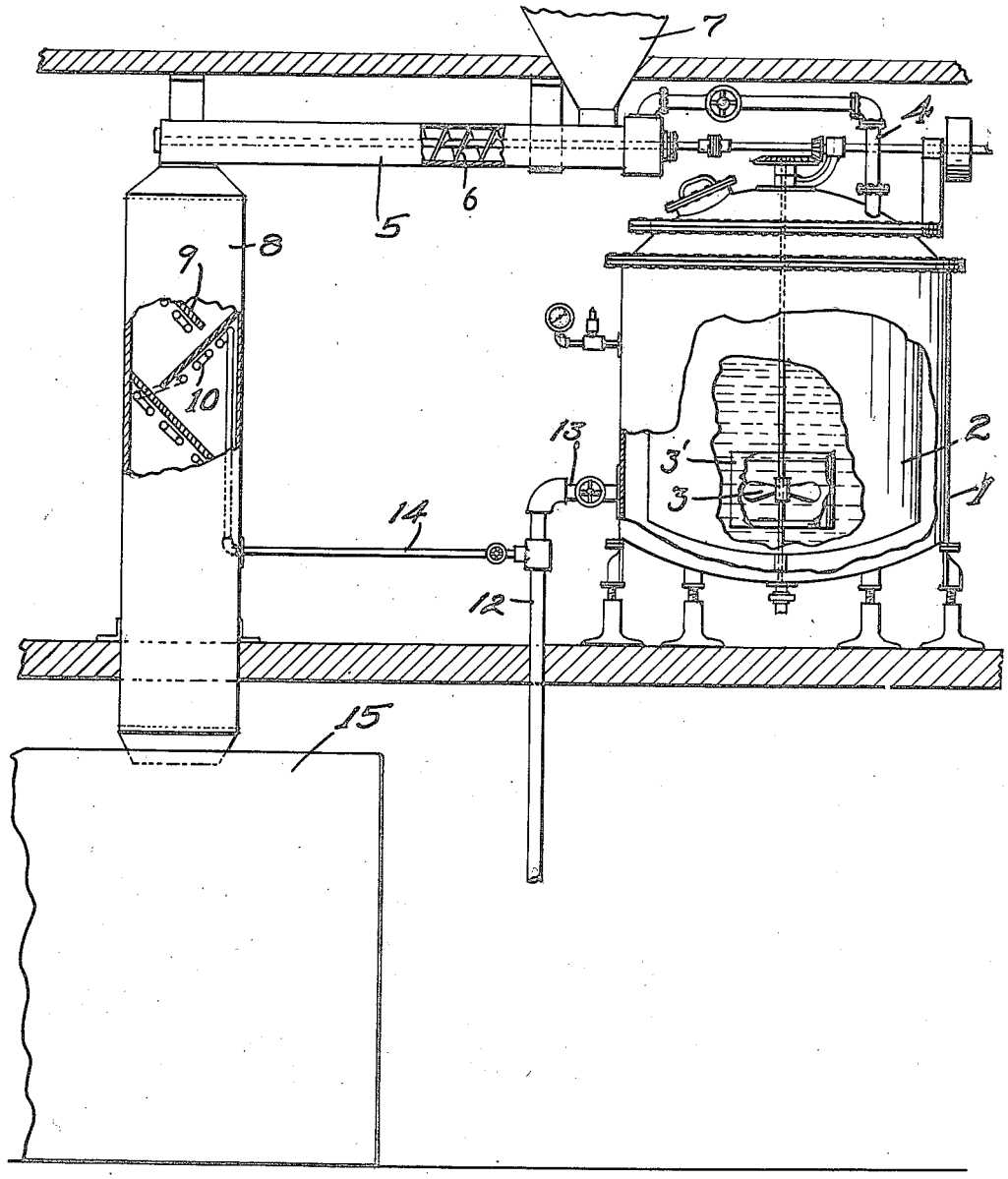

SANDER IVER CHRISTENSEN, OF WILLOWS, CALIFORNIA.

RICE-PRESERVATION PROCESS.

1,423,830.  Specification of Letters Patent.  Patented July 25, 1922.

Application filed September 19, 1921.  Serial No. 501,760.

*To all whom it may concern:*

Be it known that I, SANDER IVER CHRISTENSEN, a native of Denmark, have taken out first naturalization papers in the United States, residing at Willows, in the county of Glenn, State of California, have invented a new and useful Rice-Preservation Process, of which the following is a specification in such full and clear terms as will enable those skilled in the art to construct and use the same.

This invention relates to a process of preserving rice in order to improve its quality and to prevent the weevil from attacking the rice.

The process is especially valuable in connection with the so-called "brown rice", which consists of rice grains from which the hulls have been removed but which has not been polished, the object being to cover the rice grains so the weevil will not attack them, and also to bleach the rice so as to improve its appearance without in the slightest degree injuring its quality.

In carrying out the process about one pound of salt is dissolved in about three pounds of water to any extent necessary to provide sufficient solution to fill the apparatus in which it is used. The solution is then placed in a suitable mixing tank with an agitator to agitate and circulate the salt solution and keep it of uniform strength. This salt solution is then brought to a temperature of 180 to 212 degrees Fahrenheit, at which temperature it gives off a suitable amount of steam and carries along with the steam more or less salt from the solution.

This salt vapor is transmitted to the rice kernels by passing through a series of inclined chutes where the rice is continually agitated and stirred for a period of about ten or fifteen minutes. The vapor penetrates the bran and polish on the individual grains, but does not penetrate the inner kernel.

Following the salt vapor treatment, the rice grains are worked through another continuous automatic motion conveyor fifteen minutes longer to dry it. When dried the bran is slightly bleached from the steaming, and the rice becomes a light brown in color.

Another object of this process is that the slight quantity of salt found upon each grain of rice prevents the rice from turning rancid, as is very likely to happen with the so-called "brown rice".

It will also be understood that the quantity of salt found upon each individual grain of rice is only about one-quarter that usually applied to the rice in cooking to make it palatable, so that its food value is in no way impaired.

In the drawing the figure illustrates an apparatus for carrying out the process.

The numeral 1 indicates a steam jacket for a water boiler 2. The boiler 2 has a rotary agitator 3 at its bottom surrounded by a cylindrical shell 3' to insure complete agitation of the brine solution used.

A pipe 4 extends from the water boiler to a trough 5 containing the rotary conveyor 6. There may be any number of the rotary conveyors and troughs depending upon the quantity of grain to be treated.

A hopper 7 of a convenient type to prevent the escape of steam therefrom is used to supply the trough 5 with grain. The trough 5 discharges into a drying stack 8 in which there are a plurality of inclined shelves 9, under each of which are the steam pipes 10 to dry the steamed grain. The water jacket 1 and steam pipes in the drier receive steam from a pipe 12, with branches 13 and 14 leading to the steam jacket and drier respectively. When the grain is passed through the drier, it is discharged into a suitable bin 15 for storage.

The water boiler 2 is maintained at a sufficiently high temperature to steam well, and as the agitator 3 is operated the agitation will cause more or less of the salt solution to be given off with the steam.

It will be further understood by those skilled in the art that as the grain comes from the hulling machine it is more or less uneven in color; some is almost white, some brown, and some slightly green. This is very objectionable because the white or green grains cannot be separated from the brown grains, but following this steaming process, the white grains and green grains all appear as a light brown, the same as the ordinary brown rice, and a trace of salt is found on every grain.

Having thus described my invention what I claim is:

1. A rice treating process which consists in agitating a body of rice over a receptacle containing an edible salt solution, applying heat to said solution to cause it to steam, and then drying the rice after the steaming.

2. A process of treating rice which comprises agitating a body of rice, applying heat to a quantity of salt solution sufficient to cause it to steam, placing the rice in the steam from said solution, agitating the rice during the time it is passing through the steam ascending from said solution, and thereafter drying the steamed rice.

In testimony whereof I have hereunto set my hand this 8th day of September, A. D. 1921.

SANDER IVER CHRISTENSEN.